United States Patent [19]

Neumann

[11] Patent Number: 4,484,095
[45] Date of Patent: Nov. 20, 1984

[54] STEPPING MOTOR

[75] Inventor: Gerhard Neumann, Markdorf, Fed. Rep. of Germany

[73] Assignee: Dornier System GmbH, Fed. Rep. of Germany

[21] Appl. No.: 449,784

[22] Filed: Dec. 14, 1982

[30] Foreign Application Priority Data

Feb. 27, 1982 [DE] Fed. Rep. of Germany ....... 3207101

[51] Int. Cl.$^3$ .......................................... H02K 37/00
[52] U.S. Cl. .................................... 310/49 R; 310/82
[58] Field of Search ...................... 310/49, 80, 82, 83; 74/800

[56] References Cited

U.S. PATENT DOCUMENTS

| | | | |
|---|---|---|---|
| 3,585,425 | 6/1971 | Newell | 310/49 |
| 3,585,426 | 6/1971 | Newell | 310/49 |
| 4,081,702 | 3/1978 | Neumann | 310/49 |
| 4,117,356 | 9/1978 | Mansfield | 310/82 X |
| 4,395,650 | 7/1983 | Kettenring | 310/82 |

Primary Examiner—Donovan F. Duggan
Attorney, Agent, or Firm—James E. Bryan

[57] ABSTRACT

This invention relates to an improvement in a stepping motor composed of a stator housing containing annularly arranged electromagnets or coils with pole pieces and a magnetically conducting rotor composed of a flexible membrane solidly connected to an annular armature plate and connected to a drive shaft axially supported within the stator housing, the rotor being provided at its periphery with a toothed rim, the improvement comprising, in addition to the rotor (5), a second rotor (11) mounted on the drive shaft (3) and being composed of a flexible membrane (11') including a ring (9) provided with a toothed rim (10) conencted to the membrane (11'), the toothed rim (10) corresponding to a detent toothed rim (13) fixed to the stator housing (2), and the rotor (11) being so actuated by an electronically controlled indexing coil (15) located between the electromagnets or coils (4) that the rotor (11) is indexed or fixed in place according to the pitch of the detent toothed rim (13).

9 Claims, 5 Drawing Figures

STEPPING MOTOR

This invention relates to a stepping motor composed of a stator housing containing annularly arranged electromagnets or coils with pole pieces and a magnetically conducting rotor composed of a membrane rigidly joined to an annular armature plate, this rotor being mounted on a drive shaft axially supported in the stator housing and being provided at its periphery with a toothed rim.

German Pat. No. 2,517,974 discloses a stepping motor composed of a stator housing containing an electromagnet with conical oblate pole pieces, the rotor of which is a flexible membrane at the periphery of which is mounted a magnetically conducting flat annulus, this rotor being joined to a drive shaft axially supported within the stator housing. An annular first travel surface is so designed on that side away from the electromagnets within the stator housing that the flat annulus located at the periphery of the membrane always rests against the first travel surface in the vicinity of the energized electromagnets. Thereby, one travel ring by means of the second travel surface equivalent to the first travel surface alters by its position that of the membrane by an amount adjusted to the size of the steps and the retaining torque of the stepping motor, in the manner of a cone. The second travel surface is arranged correspondingly opposite the first. Always two diametrically opposite electromagnets are energized during operations.

A stepping motor described in German Offenlegungsschrift No. 1,763,078 is composed of a stator housing in the shape of an annulus or a pot and containing electromagnets annularly arranged therein and accessory pole pieces. A rotor in the form of a magnetically conducting flat annulus is mounted above the electromagnet on a shaft supported in a bearing block and axial within the stator housing, the rotor being supported in a rotatable manner in the bearing block as well as by a universal joint. The stator housing and the bearing block shaft respectively are provided with one and two first toothed rims near the peripheral wall of the stator housing and near the bearing block shaft, while the rotor mounted above and the planar annulus respectively evince corresponding second toothed rims. Both toothed rims differ completely with respect to their number of teeth. The stator housing and the rotor are sealed by a cover.

Moreover, a stepping motor made by the firm of Kleinwaechter at Loerrach is known, which is applicable to exceedingly minute angular steps. This stepping motor is composed of a number of electromagnets annularly arranged within the stator housing and a flexible membrane arranged above and including iron panes mounted at the periphery. By connecting and disconnecting the electromagnets or coils in the appropriate sequence, a rotating electromagnetic wave is generated. The magnetic flux depends upon the coil current, the length of the air gaps and the material used. In operation, six electromagnets are always energized simultaneously, namely three adjacent ones and those diametrically opposite. The magnetic flux, or the forces resulting therefrom, acting on iron panes mounted at the membrane periphery ensure that the flexible membrane rests against the conically oblate pole pieces of the electromagnets.

By stepwise energization of the nearest coils and simultaneous disconnection of the last-energized of the sequence, the membrane is set into rotation, performing a sort of rolling motion over the pole pieces. The torque output is at the axis of rotation of the membrane.

These known stepping motors have the drawback that the stepping accuracy, i.e., their stepping resolution and also their reproducibility, is inadequate especially for single steps, and that the wear resistance of the mutually corresponding toothed rims is too low. As a result, even toothed stepping motors require an additional high-resolution encoder in critical applications. The system complexity is much increased thereby, and also the weight. Moreover, such stepping motors provide none or only very poor latching torques when unenergized.

This being the state of the art, it is the object of the present invention to provide a stepping motor supplying a latching torque both in the energized and unenergized states and offering a reproducible single step resolution typically good to 0.5 angular degree with a tolerance of only a few seconds of arc, and for which the mutually corresponding toothed rims undergo only little wear, so that long term accuracy is assured.

Furthermore, there is no need for a high-resolution encoder for recording the stepping positions, rather it is feasible to operate as before by the conventional step-reckoning, starting from an electrically defined null point.

The invention offers one advantage in that the arrangement of a second rotor composed of a flexible membrane with a rigidly fixed toothed rim and being mounted on a detent or indexing coil located between, outside or within the electromagnets, assures precise stepping over a long life. This means that steps of a relatively accurate size are produced, the detent system providing fine adjustment for a single step or a sequence of steps within the precise, accurate range of tolerances. As a result, the range of control of the detent toothing is enlarged, and high stepping accuracy, i.e., stepping resolution (about 0.01 angular degree) is reproducibly achieved, and hence a practically negligible wear, in turn resulting in long-term accuracy. The detent coil located between the electromagnets and which is electromagnetically controlled so acts on the second toothed rim that it is indexed into any arbitrary position and can be fixed therein. Another advantage is that by using an electronic counter to register the actuation of the detent coil, the otherwise required high-resolution encoder can be dispensed with and thereby the bulk and the weight of the stepping motor can be reduced.

The invention will be further illustrated by reference to the accompanying drawings, in which.

Figure 1:
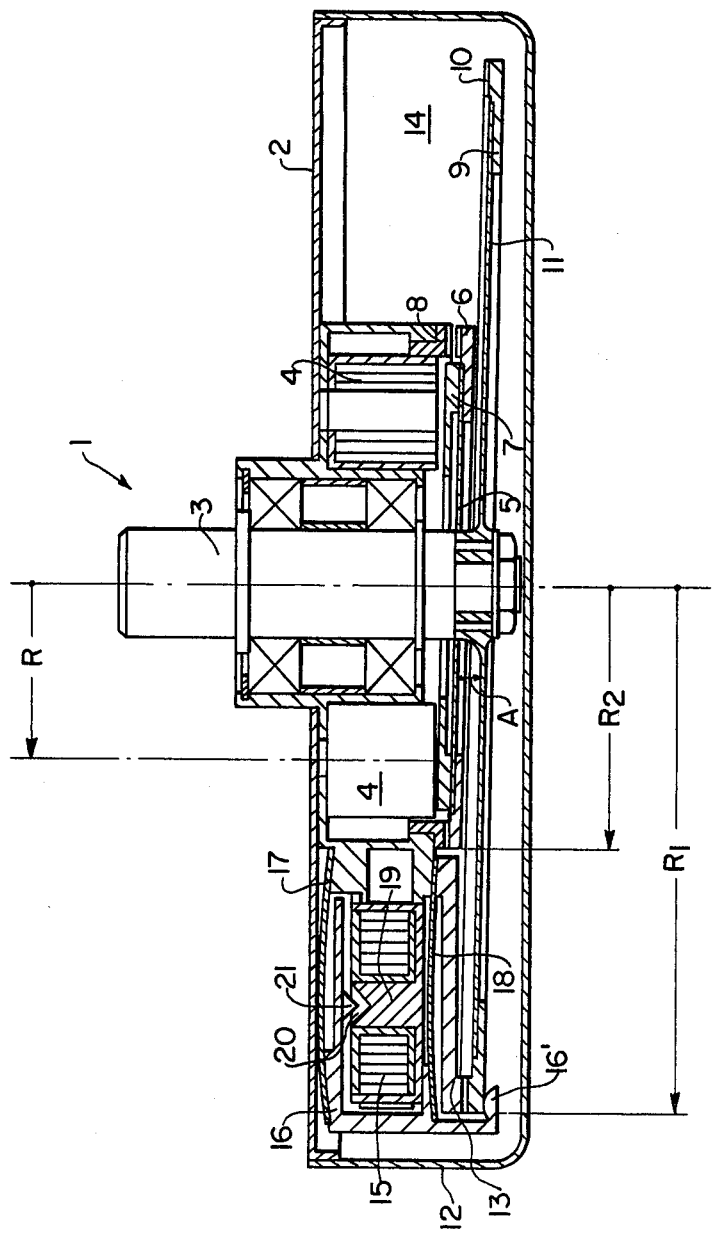
FIG. 1 is a view in elevation and cross-section of a stepping motor, showing electromagnets annularly arranged within the stator housing, and a detent coil and two toothed rotors supported on the drive shaft.

The stepping motor 1 shown in cross-sectional elevation in FIG. 1 is composed of a screened stator housing 2 sealed at the top and bottom, and containing an axially supported drive shaft 3 and electromagnets or coils 4 annularly arranged thereabout at a radius R. A flexible, torsion-resistant membrane, i.e., a rotor 5 corresponding to the radius R is connected to the lower part of the drive shaft 3, comprising at its periphery a toothed rim 6 with an armature plate or ring 7. The toothed rim 6 matches an opposite toothed rim 8 which is solidly connected to the stator housing 2. A second and also flexible rotor 11 is mounted a distance A below the membrane or rotor 5 on the drive shaft 3, this second rotor 11 comprising a ring 9 at its periphery and being provided with a toothed rim 10.

The membrane 11 can be designed selectively depending upon requirements as a complete segmented disk 11' or as a sector-shaped leaf spring 11'' (FIG. 4)—a segmented disk being used in stepping motors rotating less than 360°, for instance scan drives for spectrometers with +/−90°. The diameter or radius $R_1$ of the membrane or of the rotor 11 is about twice the diameter or the radius $R_2$ of the membrane of the rotor 5 in the example shown, although it can vary depending upon the design of the stepping motor 1. The toothed rim 10 of the membrane or rotor 11 matches a detent toothed rim 13 mounted against or near the wall 12 of the stator housing 2. The clear space 14 (also FIG. 2) between the wall 12 and the electromagnets or coils 4 houses an electronically controlled detent magnet or coil 15 of which the sector- or pot-shaped armature 16 is latched in a torsion-resistant manner by the prestressed leaf springs 17, 18. The pole piece 19 of the detent coil 15 comprises at its upper pole piece surface a conical recess 20 into which registers a corresponding cone 21 when the detent coil 15 is energized. As a result, the armature 15 is pulled downwardly and the mutually engaging sectors of the two toothed rims 10 of the membrane or rotor 11 and 13 are released by lifting the finger 16' of the armature 16 pressing against the lower side of the ring 9. The membrane or rotor 11, or the ring 9 with the toothed rim 10 will be freely rotatable once the compression from the leaf springs 17, 18 has been eliminated and motor rotation then can take place. Following termination of the step or the sequence of steps, the actuation of the detent coil 15 is terminated and the membrane or rotor 11 or the ring 9 with tooth 10, which rotated along over the same path or step, will be fixed in place by the prestressing from the two leaf springs 17, 18.

Figure 3:
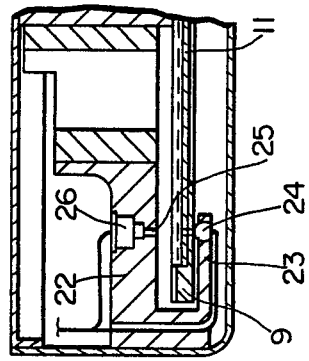
FIG. 3 shows a light switch mounted within the stator housing and corresponding to the second rotor.
Figure 2:
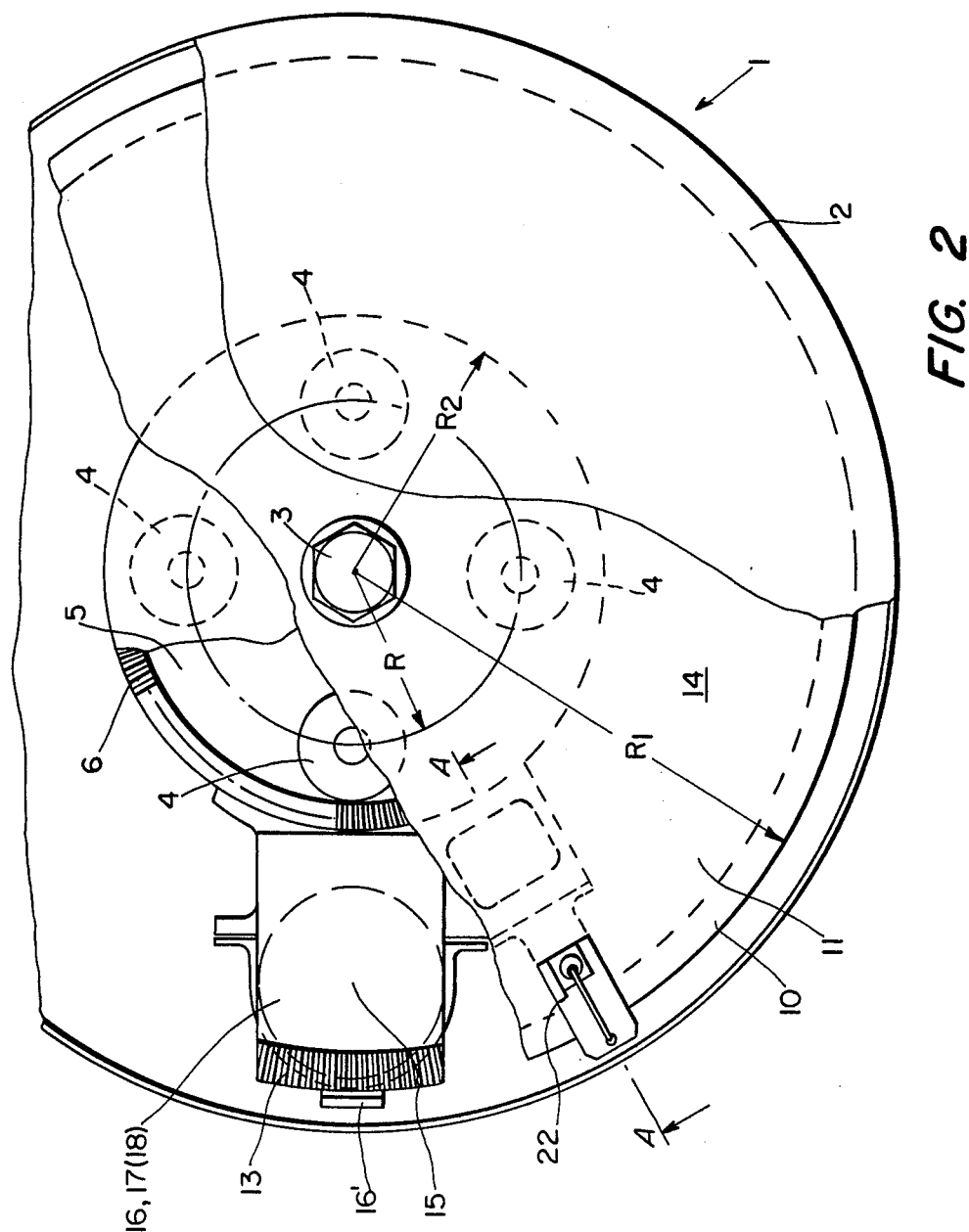
FIG. 2 shows the stepping motor of FIG. 1 in a top view.

FIG. 2 is a top view with partial cut-out of the stepping motor 1, further showing the electromagnets or coils 4 annularly arranged at a radius R about the drive shaft 3 within the stator housing 2, the membrane or rotor 5 with toothed rim 6 of radius $R_2$, the detent coil 15 with armature 16 and leaf springs 17, 18, the membrane or rotor 11 below and of radius $R_1$, and the mutually corresponding toothed rims 10 and 13. The clear space 14 of the stator housing 2 houses a light switch 22 next to the detent coil 15 and is shown along line A—A in FIG. 3. The light switch 22 is a null-position indicator making possible a null-position display for a stepping program, the number of steps performed being identical with the number of actuations of the detent coil 15. The light switch 22 is mounted in a redundant manner so that a light source 24 is mounted in a finger 23 surrounding the membrane or rotor 11 or the ring 9 in the downward direction, and of which the focused light beam is recorded after passing through passages 25 (for instance boreholes, slots) in the membrane or rotor 11 when incident on a sensor (for instance a photocell) 26 mounted above. Obviously the light source 24 also can be arranged above and the sensor 26 below the membrane 11.

The detent coil 15 and the coils 4 are so controlled by the electronics that a stable latching torque is always present at the drive shaft 3. Following a complete rotation of the stepping motor (depending upon energization there will be for instance 8 or 16 single steps for 8 coils), one step has been carried out.

Figure 4:
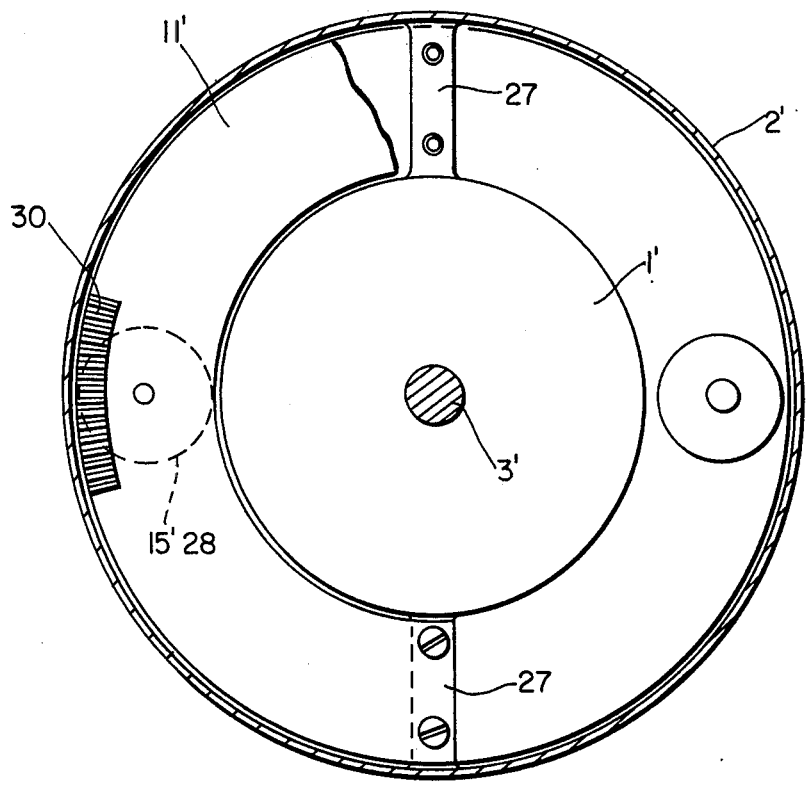
FIG. 4 shows a sector-shaped leaf spring.
Figure 5:
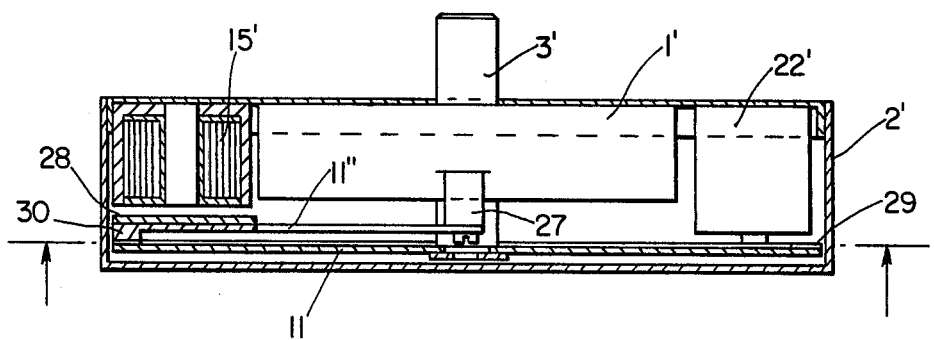
FIG. 5 is a view in elevation of FIG. 4.

FIG. 4 is a top view and FIG. 5 is an elevation of a stepping motor 1' enclosed by a stator housing 2' and provided with a drive shaft 3' and a sector-shaped leaf-spring 11'' kept in place by fastening straps 27 and joined to an armature plate 28. The rotor 11 connected to the drive shaft 3' is provided at its periphery with a toothed rim 29 matching the toothed rim 30 of the leaf spring 11''—i.e., which indexes upon the energization of a detent coil 15' mounted above. The detent coil 15' is offset by 180° from a light switch 22' acting as a null-position indicator.

It will be obvious to those skilled in the art that many modifications may be made within the scope of the present invention without departing from the spirit thereof, and the invention includes all such modifications.

What I claim is:

1. In a stepping motor composed of a stator housing containing annularly arranged electromagnets or coils with pole pieces and a magnetically conducting rotor composed of a flexible membrane solidly connected to an annular armature plate and connected to a drive shaft axially supported within the stator housing, said rotor being provided at its periphery with a toothed rim, the improvement comprising, in addition to the rotor (5), a second rotor (11) mounted on the drive shaft (3) and being composed of a flexible membrane (11') including a ring (9) provided with a toothed rim (10) connected to said membrane (11'), said toothed rim (10) corresponding to a detent toothed rim (13) fixed to the stator housing (2), and the rotor (11) being so actuated by an electronically controlled indexing coil (15) located between the electromagnets or coils (4) that the rotor (11) is indexed or fixed in place according to the pitch of the detent toothed rim (13).

2. A stepping motor according to claim 1 in which the indexing coil (15) is mounted along a larger radius ($R_1$) outside the radius (R) of the electromagnets or coils (4).

3. A stepping motor according to claim 1 in which the indexing coil (15) is arranged along a lesser radius within the radius (R) of the electromagnets or coils (4).

4. A stepping motor according to claim 1 in which the diameter or radius ($R_1$) of the second rotor (11) equals that of the detent coil (15).

5. A stepping motor according to claim 1 in which the second rotor (11) is a sector-shaped leaf spring (11'').

6. A stepping motor according to claim 1 in which the actuation of the detent coil (15) is achieved by a corresponding electronic control of the motor.

7. A stepping motor according to claim 1 including a light switch (22) corresponding to the second rotor (11) mounted within the stator housing (2).

8. A stepping motor according to claim 1 including a mechanical or magnetic switch (26') corresponding to the second rotor (11) mounted within the stator housing (2).

9. A stepping motor according to claim 1 in which the second rotor is a stiff disk (11') and the toothed rim (13) is directly actuated by the detent coil (15).

* * * * *